(12) United States Patent
Kamijima et al.

(10) Patent No.: US 6,981,773 B2
(45) Date of Patent: Jan. 3, 2006

(54) PROJECTOR

(75) Inventors: Shunji Kamijima, Hara-mura (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/872,385

(22) Filed: Jun. 22, 2004

(65) Prior Publication Data

US 2005/0018150 A1    Jan. 27, 2005

(30) Foreign Application Priority Data

Jul. 16, 2003  (JP) ............................. 2003-198136

(51) Int. Cl.
*G03B 21/28* (2006.01)
*G03B 21/14* (2006.01)
*G03B 3/00* (2006.01)
*G02B 7/02* (2006.01)

(52) U.S. Cl. .................... 353/81; 353/101; 353/102; 359/813

(58) Field of Classification Search ................ 353/69, 353/81, 101–102, 122; 359/813
See application file for complete search history.

(56) References Cited

U.S. PATENT DOCUMENTS

| | | | | |
|---|---|---|---|---|
| 3,019,704 A | * | 2/1962 | Zillmer | 353/101 |
| 4,482,224 A | * | 11/1984 | Johansson | 353/101 |
| 5,513,025 A | | 4/1996 | Watanabe et al. | 349/106 |
| 5,621,487 A | | 4/1997 | Shirochi | 349/112 |
| 6,310,724 B1 | | 10/2001 | Shirochi | 359/569 |

FOREIGN PATENT DOCUMENTS

| | | |
|---|---|---|
| EP | 0 698 804 A2 | 2/1996 |
| EP | 1 213 598 A2 | 6/2002 |
| JP | 05-260424 | 10/1993 |
| JP | A 05-260424 | 10/1993 |
| JP | 8-122709 | 5/1996 |
| JP | A 2000-241897 | 9/2000 |
| JP | A 2001-194729 | 7/2001 |

* cited by examiner

*Primary Examiner*—Christopher Mahoney
(74) *Attorney, Agent, or Firm*—Oliff & Berridge, PLC (57) ABSTRACT

A projector includes a super-high pressure mercury lamp a spatial light-modulator that modulates a light from the super-high mercury lamp based on an image signal, a projection lens that projects the light modulated, and an optical filter that is used to insert a prism group in the optical path and to remove the prism group that is inserted in the optical path, and a position fixing part that makes a relative-angle between each spatial light-modulator and the prism group constant.

5 Claims, 8 Drawing Sheets

SPATIAL LIGHT MODULATOR

PROJECTOR

BACKGROUND OF THE INVENTION

1) Field of the Invention

The present invention relates to a projector.

2) Description of the Related Art

A dot-matrix display device is widely used as an image display device, such as a liquid crystal panel (a liquid crystal display device), a cathode ray tube (CRT) display device, and a plasma display device. The dot-matrix display device displays an image by a number of pixels that are arranged periodically in a two dimensional array. However, the periodic arrangement of the pixels causes a sampling noise that deteriorates quality of the image, which makes the image rough and less smooth. One of the methods to reduce deterioration of the quality of the image is disclosed in, for example, Japanese Patent Application Laid-Open No. H8-122709.

The dot-matrix image display device has a light-shielding portion called a black matrix. The black matrix is an area between each of the pixels to suppress an unnecessary light. In recent years, it is getting more popular to watch a large screen from comparatively close distance. For this reason, a watcher may recognize a black matrix image in a conventional dot-matrix image display device, resulting in the deterioration of the quality of the image. The conventional technology disclosed in the Patent Publication 1 can hardly reduce the deterioration of the quality of the image caused by the black matrix image.

One of the ideas to prevent the black matrix image from appearing is to input a light from the image display device into a prism group. Flat surfaces of the prism group transmit the light as it is; while refracting surfaces refracts the light. The light transmitted the prism group includes a straight light from the flat surfaces and a refracted light from the refracting surfaces. The refracted light is deflected and forms a pixel image on the black matrix area. As a result, the black matrix image becomes hard to recognize.

However, the projector is generally used to project a picture image, such as a film, and the text images, such as a character, a graph, and a chart, in the presentation. If the projector projects the text image using the prism group, the text image gets blurred and the quality of the text image lessens. Moreover, having two projectors for each purpose, projecting the picture image and projecting the text image, is wasteful. Consequently, having one projector that projects the high-quality image in the various uses is preferable.

The present invention is made to solve the above problems and the purpose of the present invention is to provide a projector that projects a high-quality image in the various uses, such as projecting a film, the presentation.

SUMMARY OF THE INVENTION

The projector according to one aspect of the present invention includes a light source that supplies a light, a spatial light-modulator that modulates the light based on an image signal and outputs a modulated light, a projection lens that projects the modulated light to display an image on a screen, and an optical element inserting unit that inserts a first optical element in an optical path. The optical element inserting unit includes a position fixing unit that keeps an angle between the spatial light-modulator and the first optical element constant.

When the projector projects the picture image like a film, that is, the image signal is a signal of the film, the optical element, such as the prism group, is inserted in the optical path and on a side where the spatial light-modulator outputs the light. Therefore, the prism group refracts the light that the spatial light-modulator modulates and the projection image of the black matrix gets blurred. When the projector projects the images in the presentation, such as a character, the above optical element is removed from the optical path. Therefore, the light that the spatial light-modulator modulates is projected as it is and the projection image gets sharp. In other words, the projection image is crisp and not blurred. To get the sharp image, the relative angle between the pixel of the spatial light-modulator and the prism group needs to be constant. In the technology of the present invention, the projector includes the position fixing part that makes the relative angle between the spatial light-modulator and the optical element constant, and the position of the optical element is fixed when the optical element is inserted in the optical path.

According to another aspect of the present invention, the optical element inserting unit further includes a second optical element, and selectively inserts the first optical element or the second optical element in the optical path. A first optical length when the first optical element is inserted in the optical path is substantially equal to a second optical length when the second optical element is inserted in the optical path. In the optical length from the spatial light-modulator to the screen, the optical length when the first optical element is inserted in the optical path is different from that when the first optical element is removed from the optical path, and the difference of the optical length causes the projection image to be out of focus. The optical path is obtained from the refractive index multiplied by the thickness. In the technology of the present invention, the difference of the optical length is removed and the projection image is always in focus when any one of the first optical element or the second optical element is inserted in the optical path.

According to still another aspect of the present invention, the first optical element is either of a refracting optical element and a diffracting optical element, and the second optical element is a transparent plate. The refracting optical element refracts and deflects the light that the spatial light-modulator outputs while the diffracting optical element diffracts and deflects the light that the spatial light-modulator outputs. The light that the spatial light-modulator outputs is refracted or diffracted and shifts the pixel image. In the technology of the present invention, the light is refracted and diffracted to projects the pixel image on the black-matrix image, so that the observer does not see the black-matrix image. On the other hand, the second optical element is a parallel plate and the parallel plate does not bring about the optical functions such as refraction, diffraction. When the projector projects the text image, the parallel plate is inserted in the optical path. Therefore, the light that the spatial light-modulator modulates is projected as it is and the text image gets sharp.

According to still another aspect of the present invention, the optical element inserting unit is arranged in the optical path between the spatial light-modulator and the projection lens. Therefore, the three-plate projector, for example, has the prism groups that are optimized for the spatial light-modulators corresponding to each color.

According to still another aspect of the present invention, the optical element inserting unit is arranged between the projection lens and the screen. Therefore, the projector has a single prism group instead of a plurality of prism groups and is configured inexpensively and simply.

The other objects, features, and advantages of the present invention are specifically set forth in or will become apparent from the following detailed descriptions of the invention when read in conjunction with the accompanying drawings.

DETAILED DESCRIPTION

Exemplary embodiments of a spatial light modulator and a projector according to the present invention are explained in detail with reference to the accompanying drawings.

Figure 1:
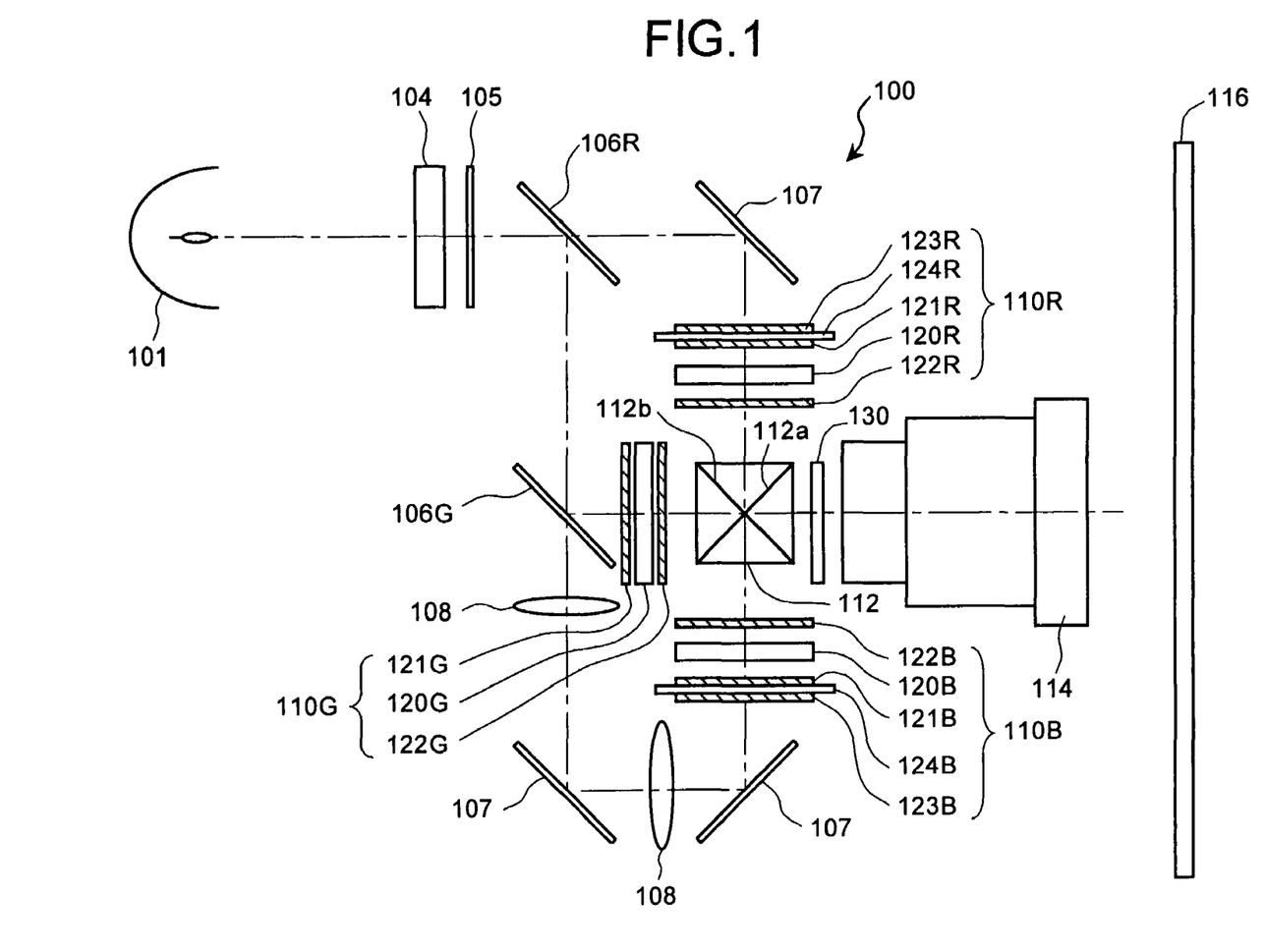
FIG. 1 is a schematic of a projector according to a first embodiment of the present invention.

FIG. 1 is a schematic of a projector according to a first embodiment of the present invention. A super-high pressure mercury lamp 101 generates a light that includes a red light, a green light, and a blue light (hereinafter, "R-light", "G-light", and "B-light", respectively). An integrator 104 uniforms an illuminance distribution of the light. A polarization converter 105 changes the light with the uniform illuminance-distribution into a polarized light such as an s-polarized light. The s-polarized light enters into a red-light transmitting dichroic mirror 106R. The red-light transmitting dichroic mirror 106R transmits the R-light, but reflects the G-light and the B-light. The dichroic mirrors separate the light into the R-light, the G-light, and the B-light in order.

After the R-light passes through the red-light transmitting dichroic mirror 106R, a reflecting mirror 107 bends the R-light by 90 degrees. Then a first-color spatial light modulator 110R, which is a transparent liquid-crystal display device, modulates the R light based on an image signal corresponding to red. The R-light is still s-polarized when the R-light enters into the first-color spatial light modulator 110R, because the dichroic mirrors do not change the polarization direction.

The first-color spatial light modulator 110R includes a λ/2 wave plate 123R, a glass plate 124R, a first polarizing plate 121R, a liquid crystal panel 120R, and a second polarizing plate 122R. The λ/2 wave plate 123R and the first polarizing plate 121R sandwich a glass plate 124R, so that the heat does not distort the λ/2 wave plate 123R and the first polarizing plate 121R. The glass plate 124R is transparent and does not affect the polarization. The second polarizing plate 122R may be attached to the emergent surface of the liquid crystal panel 120R or the incident surface of a cross dichroic prism 112.

The first-color spatial light modulator 110R modulates the R-light as follows. The λ/2 wave plate 123R changes the s-polarized R light into a p-polarized R light. After passing though the glass plate 124R and the first polarizing plate 121R, the p-polarized R-light enters into the liquid crystal panel 120R. The liquid crystal panel 120R modulates the p-polarized R-light based on the image signal corresponding to red and changes the p-polarized R-light into an s-polarized R-light. Then the second polarizing plate 122R outputs the s-polarized R-light to the cross dichroic prism 112.

The red-light transmitting dichroic mirror 106R deflects the G-light and the B-light by 90 degrees. The blue-light transmitting mirror 106G reflects the G-light, but transmits the B-light. Then a second-color spatial light modulator 110G, which is a transparent liquid-crystal display device, modulates the G-light based on an image signal corresponding to green. The second-color spatial light modulator 110G includes a liquid crystal panel 120G, a first polarizing plate 121G, and a second polarizing plate 122G.

The G-light is s-polarized when the G-light enters into the second-color spatial light modulator 110G. After passing though the first polarizing plate 121G, the s-polarized G-light enters into the liquid crystal panel 120G. The liquid crystal panel 120G modulates the s-polarized G-light based on an image signal corresponding to green and changes the s-polarized G-light into a p-polarized G-light. Then the second polarizing plate 122G outputs the p-polarized G-light to the cross dichroic prism 112.

After passing through the blue-light transmitting mirror 106G, the B-light enters into a third-color spatial light modulator 110B via two relay lenses 108 and two reflecting mirrors 107. The third-color spatial light modulator 110B, which is a transparent liquid-crystal display device, modulates the B-light based on an image signal corresponding to blue.

The B-light goes via the relay lenses 108 because the optical path of the B-light is longer than those of the R-light and the G-light. The relay lenses 108 are configured to transmit the B-light to the third-color spatial light modulator 110B as it is. The third-color spatial light modulator 110B includes a λ/2 wave plate 123B, a glass plate 124B, a first polarizing plate 121B, a liquid crystal panel 120B, and a second polarizing plate 122B. The configuration of the third-color spatial light modulator 110B is same as that of the first-color spatial light modulator 110R and the explanation is omitted.

The B-light is s-polarized when the B-light enters into the third-color spatial light modulator 110B. The λ/2 wave plate 123B changes the s-polarized B-light into a p-polarized B-light. After passing though the glass plate 124B and the first polarizing plate 121B, the p-polarized B-light enters into the liquid crystal panel 120B. The liquid crystal panel 120B modulates the s-polarized B-light based on an image signal corresponding to blue and changes the s-polarized G-light into a p-polarized G-light. Then the second polarizing plate 122B outputs the s-polarized B-light to the cross dichroic prism 112. Thus, the red-light transmitting dichroic mirror 106R and the blue-transmitting dichroic mirror 106G separate the light from the super-high pressure mercury lamp 101 into the R-light, the G-light, and the B-light.

The dichroic prism 112 includes two dichroic layers 112a, 112b that are crossed each other. The dichroic layer 112a reflects the B-light and transmits the R-light and the G-light, while the dichroic layer 112b reflects the R-light and transmits the B-light and the G-light. In this manner, the dichroic prism 112 synthesizes the R-light, the G-light, and the B-light that are modulated by the first-color spatial light modulator, the second-color spatial light modulator, and the third-color spatial light modulator, respectively. The synthesized light is incident on an optical filter 130, and the light transmitted is incident on a projection lens 114. Then the projection lens 114 projects the light combined by the dichroic prism 112 onto a screen 166 to display a full-color image.

The cross dichroic prism 112 synthesizes the R-light, G-light, and B-light effectively. To synthesize the lights effectively, each spatial-light modulator is configured to output the light with the different polarization direction. When each light enters into the cross dichroic prism 112, the R-light and the B-light is s-polarized while the G-light is p-polarized. This configuration comes from the reflection characteristic of the dichroic layers 112a and 112b. The dichroic layers 112a and 112b usually have the better reflection characteristic in an s-polarized light, so that the dichroic layers 112a and 112b are configured to reflect the R-light and the B-light that are s-polarized and transmit the G-light that is p-polarized.

Figure 2:
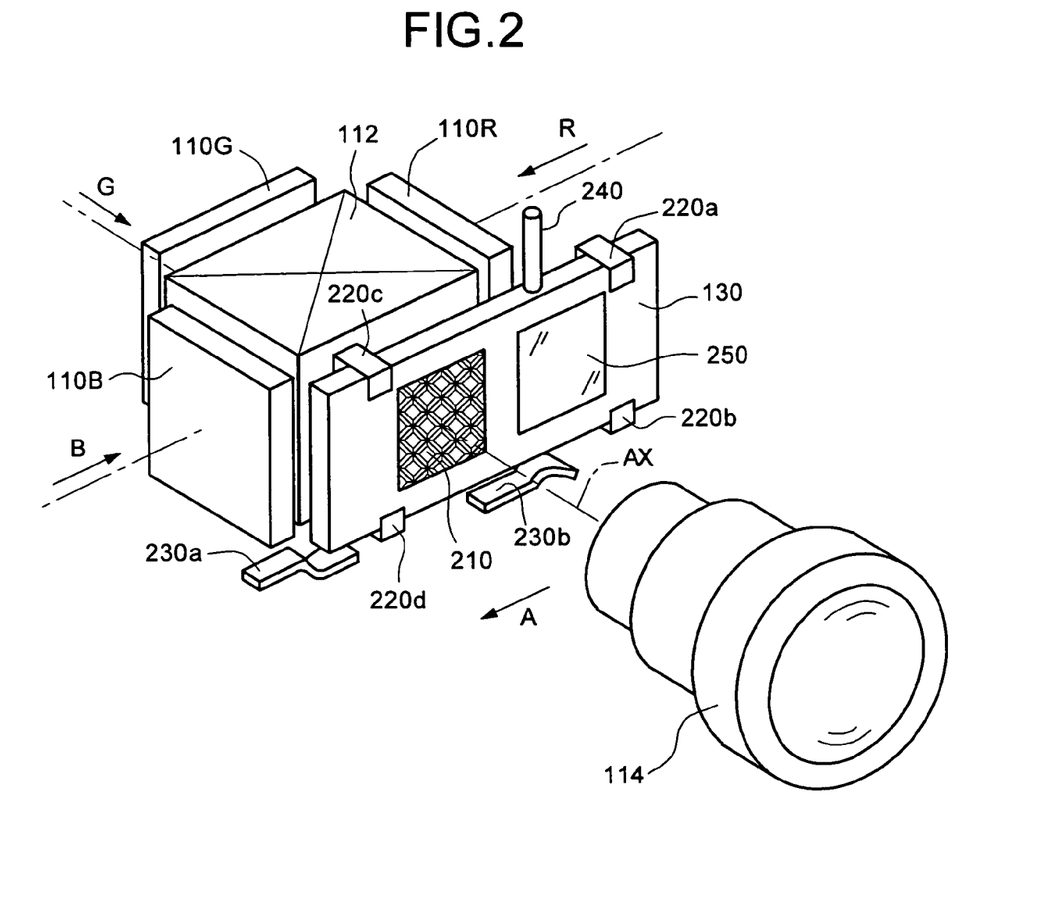
FIG. 2 is a perspective view of spatial light-modulators of the projector according to the first embodiment.

FIG. 2 is a schematic for illustrating partial components of the projector, especially the components that are on the optical path from the spatial light-modulators 110R, 110G, and 110B to the projection lens 114. The optical filter 130 is located on the optical path and between the spatial light-modulators 110R, 110G, and 110B and the projection lens 114, especially between the cross dichroic prism 112 and the projection lens 114. The optical filter 130 may be a single optical filter instead of a plurality of optical filters, so that the projector is configured inexpensively and simply.

The optical filter 130, which can be inserted in the optical path and be removed from the optical path, is located on a side where each spatial light-modulators 110R, 110G, 110B outputs the light. The optical filter 130 includes a prism group 210, which is a refracting optical element, and a parallel plate 250, which is another optical element and optically transparent. When the projector 100 projects the image like a film (hereinafter, "picture image"), the prism group 210 is inserted in the optical path while the parallel plate 250 is removed from the optical path.

Figure 3:
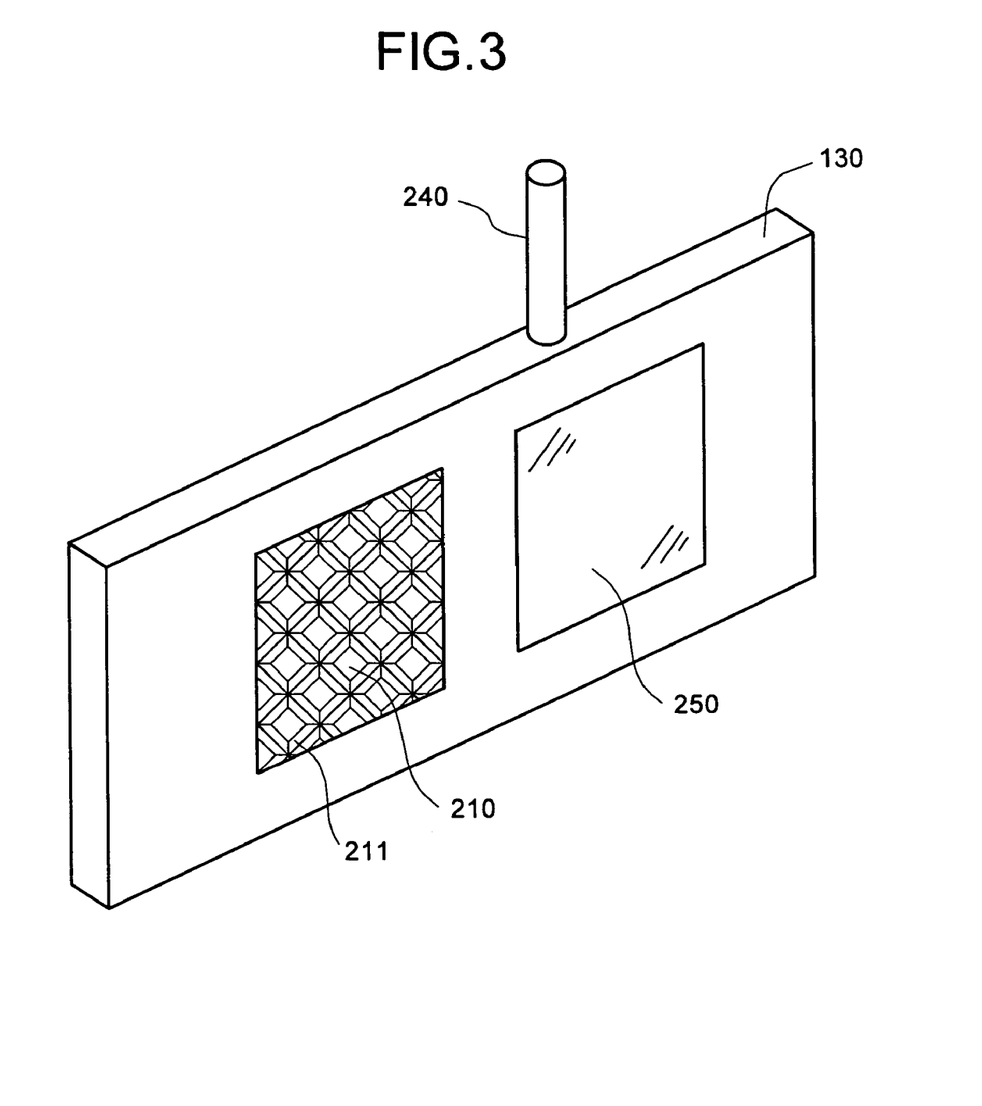
FIG. 3 is a perspective view of an optical filter according to the first embodiment.

FIG. 3 is a perspective view of the optical filter 130. The prism group 210 is composed of prism elements 211 that are arrayed, and the prism element 211 includes a V-shaped depression and a flat surface. After each spatial light-modulator 110R, 110G, and 110B modulates the light, the light that enters into the flat surface goes straight and forms the pixel image while the light that enters into the gradient of the V-shaped depression is refracted and deflected. The gradient angle and the gradient direction are configured to shift the light deflected to the black-matrix image. Consequently, the observer does not see the black-matrix image.

Referring back to FIG. 2, a motor (not shown) moves the optical filter to the direction that is substantially orthogonal to the optical axis AX using a lever 240, and inserts the prism group 210 or the parallel plate 250 in the optical path. Four guides 220a, 220b, 220c, and 220d control the moving direction of the optical filter to the direction of an arrow A. To insert the prism group 210 in the optical path, the optical filter 130 is moved till an end of the optical filter 130 makes a contact with a position fixing part 230a. When the end of the optical filter 130 makes a contact with the position fixing part 230a, the relative angle between the prism group 210 and the pixel parts of the spatial light-modulators 110R, 110G, and 110B is constant. The position fixing part 230a is made of elastic material like a spring and another position fixing part 230b is the same.

The gradient of the V-shaped depression is oriented where the light refracted and deflected goes. Therefore, preferably, to form the pixel images on the black-matrix images, the pixel is configured to make a certain relative-angle with the prism group 210, especially the gradient of the V-shaped depression. In the present embodiment, each spatial light-modulator 110R, 110G, and 110B is fixed while the optical filter 130 is movable, and the pixel is configured to make a certain relative-angle with the gradient of the V-shaped depression when the position fixing part 230 fixes the optical filter 130. In this manner, the position of the prism group 210 is fixed on the optical path.

When the projector 100 projects the text image, such as a character, in the presentation, the parallel plate 250 is inserted in the optical path. To insert the parallel plate 250 in the optical path, the optical filter 130 is moved farther to the direction of the arrow A while bowing down the position fixing part 230a, and the position fixing part 230b stops the optical filter 130 by making a contact with another end of the optical filter 130. When the position fixing part 230b makes a contact with another end of the optical filter 130, the parallel plate 250 is inserted in the optical path while the prism group 210 is removed from the optical path.

The parallel plate 250 does not bring about the optical functions such as refraction, diffraction. When the text image is projected, the parallel plate 250 is inserted in the optical path, so that the light that each spatial light-modulator modulates is projected as it is. Consequently, the text image gets sharp.

In this manner, the projector 100 according to the present embodiment projects the high-quality picture image and the sharp text image by switching between the prism group 210 and the parallel plate 250. When the projector 100 projects the picture image, the prism group 210 is inserted in the optical path and on a side where each spatial light-modulator outputs the light modulated. Consequently, the prism group 210 refracts the light, and the observer does not see the black-matrix image. When the projector 100 projects the text image, the parallel plate 250 is inserted in the optical path. Consequently, the light that each spatial light-modulators 110R, 110G, and 110B modulates goes without receiving any optical functions and forms the text image, so that the text image gets sharp.

In the present embodiment, the length of the optical path when the prism group 210 is inserted in the optical path is substantially equal to that when the parallel plate 250 is inserted in the optical path, so that the projector 100 projects the high-quality picture image and the high-quality text image. To have the substantial same optical paths, the value of the refractive index multiplied by the thickness of the glass material that composes the prism group 210 is configured to be same as that of the glass material that composes the parallel plate 250. If the projector 100 does not have the parallel plate 250, the length of optical path when the prism group is inserted in the optical path is not equal that when the prism group 210 is not inserted in optical path. Therefore, when the prism group 210 is not on the optical path, the difference of the optical length causes the projection image to get blurred. In the present embodiment, the projector 100 includes the parallel plate 250 to remove the difference of the optical length, so that the projector 100 projects the picture image and the text image that are in focus.

Figure 4:
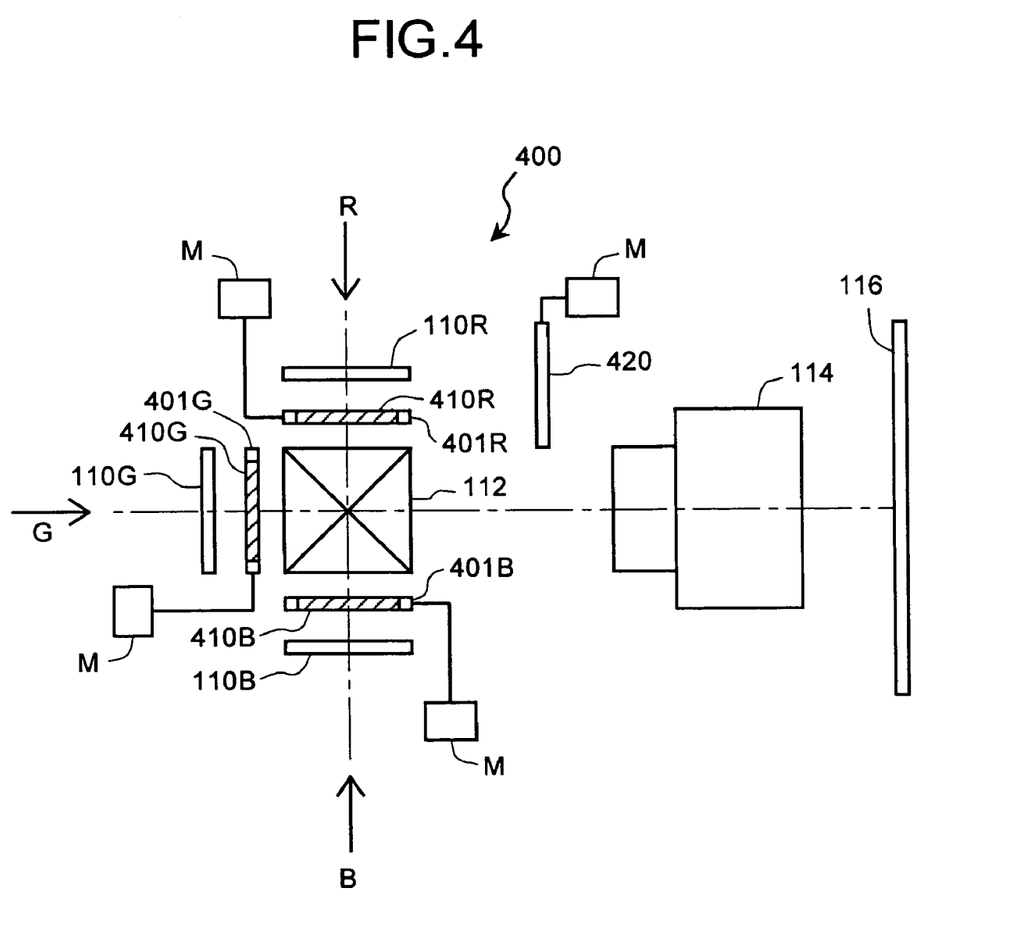
FIG. 4 is a schematic of a projector according to a second embodiment of the present invention.
Figure 5:
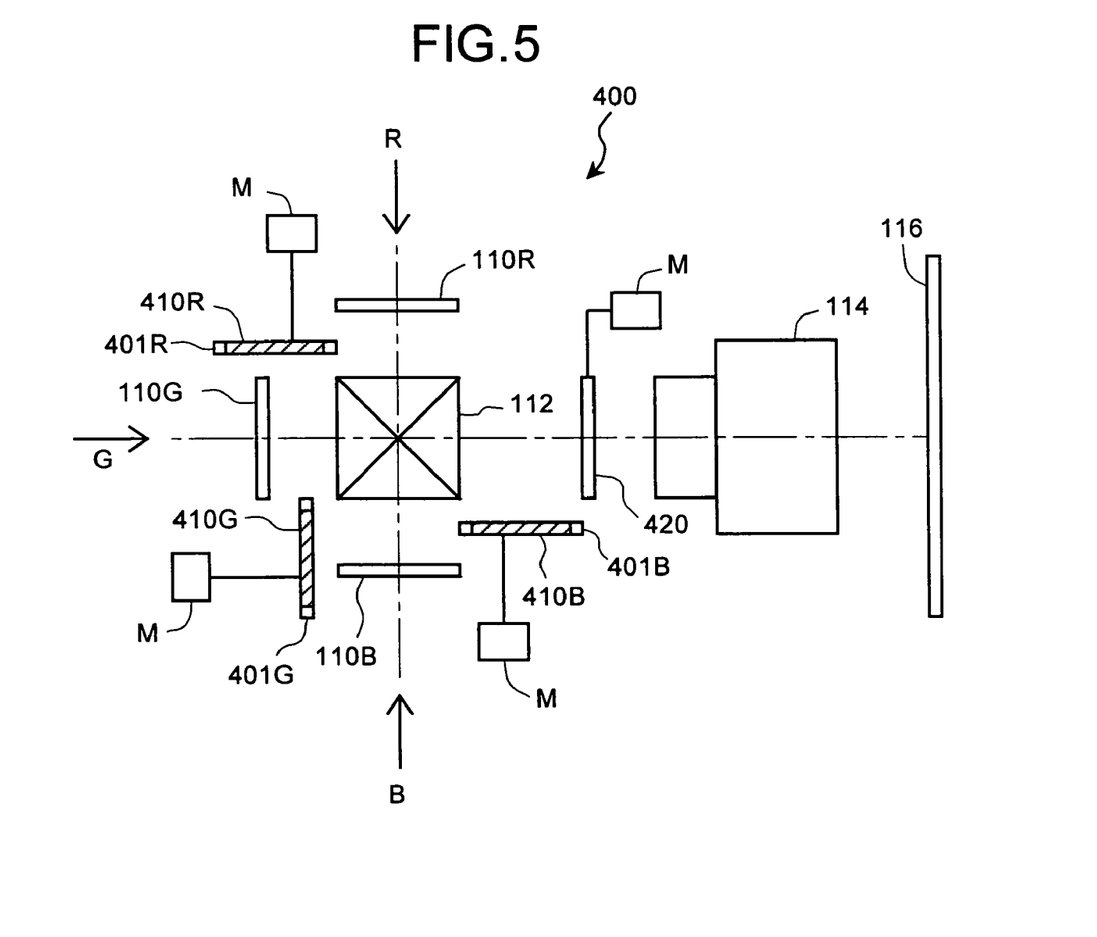
FIG. 5 is a schematic of another projector according to the second embodiment.

FIG. 4 and FIG. 5 are schematics for illustrating components on the optical path from each spatial light-modulator 110R, 110G, and 110B to the screen 116. The components on the optical path from the super-high pressure mercury lamp 101 to each spatial light-modulator 110R, 110G, and 110B are same as those of the first embodiment. Therefore the same components are not shown in FIG. 4 and FIG. 5, the same reference symbols are applied to the same components, and the explanations of the same components are omitted. A red-light optical filter 401, which can be inserted in the optical path and removed form the optical path, is located on the optical path and between the red-light spatial light-modulator 110R and the cross dichroic prism 112. The red-light optical filter 401R includes the prism group. A motor M is configured to have functions for inserting the red-light optical filter 401R in the optical path and for removing the red-light optical filter 401R from the optical path. The red-light optical filter 401R, shown in FIG. 4, is on the optical path.

A green-light optical filter 401G and a blue-light optical filter 401B are similar with the red-light optical filter 401R. The green-light optical filter 401G is on the optical path and located between the green-light spatial light-modulator 110G and the cross dichroic prism 112 while the blue-light optical filter 401B is on the optical path and located between the blue-light spatial light-modulator 110B and the cross dichroic prism 112. Another motor M is configured to insert the green-light optical filter 401G in the optical path and to remove the green-light optical filter 401G from the optical path while another motor M is configured to insert the blue-light optical filter 401B in the optical path and to remove the optical filter 401B from the optical path. Each optical filter 401G, 401B, shown in FIG. 4, is on the optical path.

A parallel plate 420, which is another optical element and made of glass material, is located between the cross dichroic prism 112 and the projection lens 114. Another motor M is configured to insert the parallel plate 420 in the optical path and to remove the parallel plate 420 from the optical path. The parallel plate 420, shown in FIG. 4, is not on the optical path. When the projector 400 projects the film, the parallel plate 420 is not inserted in the optical path while each prism group 410R, 410G, and 410B is inserted in the optical path (corresponding to each color). In the same way of the first embodiment, guides (not shown) and position fixing parts (not shown) fix the position where each prism groups 410R, 410G, and 410B is inserted in the optical path (corresponding to each color). The lights that each spatial light-modulator 110R, 110G, and 110B modulates are refracted on each prism groups 410R, 410G, and 410B with a certain direction to move the projection image for a certain distance. Consequently, the observer does not see the image of the black matrix.

When the light is refracted on the gradient of the prism element 211, the wave-length of the light determines the refractive angle and the distance that the projection image moves by the refraction. In the present embodiment, each prism groups 410R, 410G, and 410B is optimized for the wave-length corresponding to each color. For example, the prism group 410R is oriented so that that the R-light that is output form the pixel of the red-light spatial light-modulator 110R forms the image on the black-matrix image on the screen 116. The same is applied to the G-light and the B-light. Consequently, the projection image that is synthesized form the R-light, the G-light, and the B-light in focus, sharp, and seamless, and the observer does not see the image of the black matrix.

How the projector 400 projects the text image is explained with reference to FIG. 5. When the projector 400 projects the text image, the motor M inserts the parallel 420 in the optical path while the other motors M remove the prism groups 410R, 410G, and 410B from the optical path. The lights that each spatial light-modulators 410R, 410G, and 410B outputs are projected on the screen 116 as it is, because the lights do not pass through the prism groups 410R, 410G, and 410B and are not refracted.

Similarly with the first embodiment, the optical length of the parallel plate 420 is substantially equal to the optical length of each prism group 410R, 410G, and 410B. Therefore, the image that is projected on the screen 116 is in focus when each prism groups 410R, 410G, and 410B is inserted in the optical path, shown in FIG. 4, or when the parallel plate 420 is inserted in the optical path, shown in FIG. 5. Consequently, the observer sees the high-quality image without seeing the black-matrix image of when the projector 400 projects the picture image, and the observer sees the high-quality and sharp text-image when the projector 400 projects the text image.

Figure 6A:
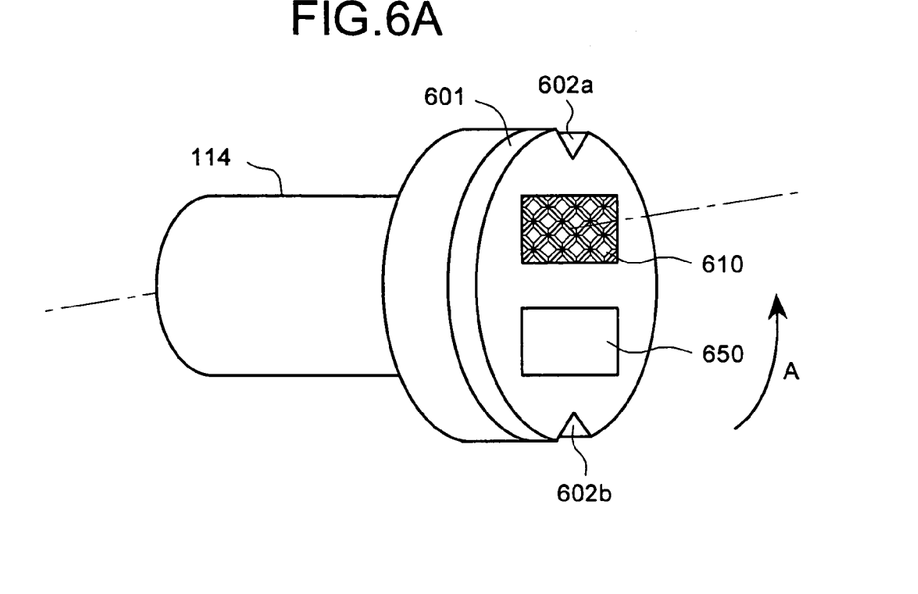
FIG. 6A and FIG. 6B are perspective views of a projection lens according to a third embodiment of the present invention.
Figure 6B:
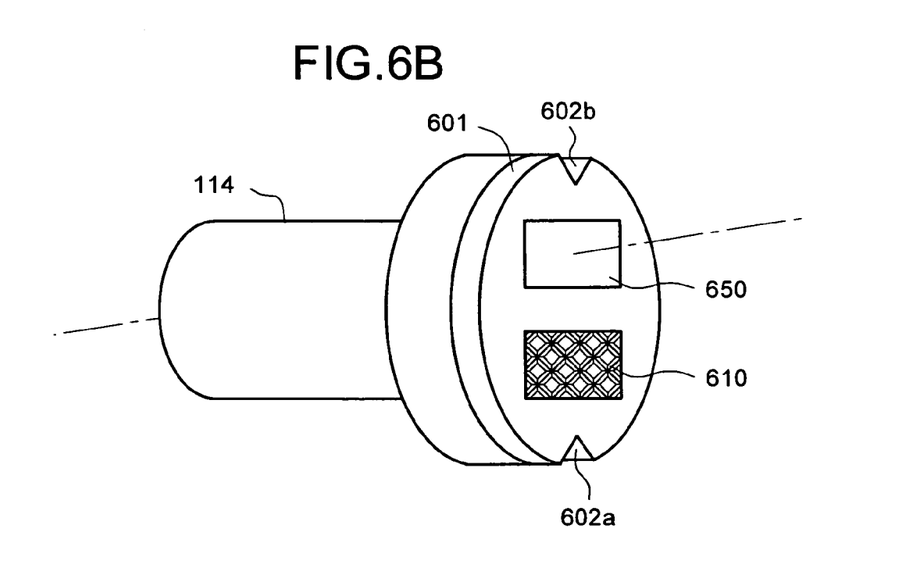

The configuration of the projection lens 114 according to a third embodiment is explained with reference to FIG. 6A and FIG. 6B. The same reference symbols are applied to the same components as the first embodiment and the second embodiment, and the explanations of the same components are omitted. An optical filter 601, which can be inserted in the optical path and removed from the optical path, is located on a side where the projection lens 114 outputs the light. The projection lens 114 is arranged so that the optical axis of the project lens 114 substantially corresponds to the normal of each spatial light-modulator 110R, 110G, and 110B. A prism group 601, shown in FIG. 6(a), is inserted in the optical path. The projector is usually placed on the desk and the like, and the screen is usually arranged upward to the observer so that the observer sees the screen easily. When the screen 116 is arranged upward to the projection lens 114, the light that each spatial light-modulator 110R, 110G, and 110B modulates enters into the substantial center of the incident-side opening of the projection lens 114, and goes out from the periphery of the exit-side opening of the projection lens 114 as shown in FIG. 6A.

Similarly with the other embodiments, the optical filter 601, which is circular, includes a prism group 610 and a parallel plate 650. The optical filter 601 also includes notches 602a, 602b, which is a kind of position fixing part, on the opposite edges. The projection lens 114 includes a protrusion (not shown) that is made of elastic material like a spring. When the notch 602a is engaged with the protrusion, the pixel of the prism group 610 makes a certain angle with each spatial light-modulator 110R, 110G, and 110B.

Figure 7:
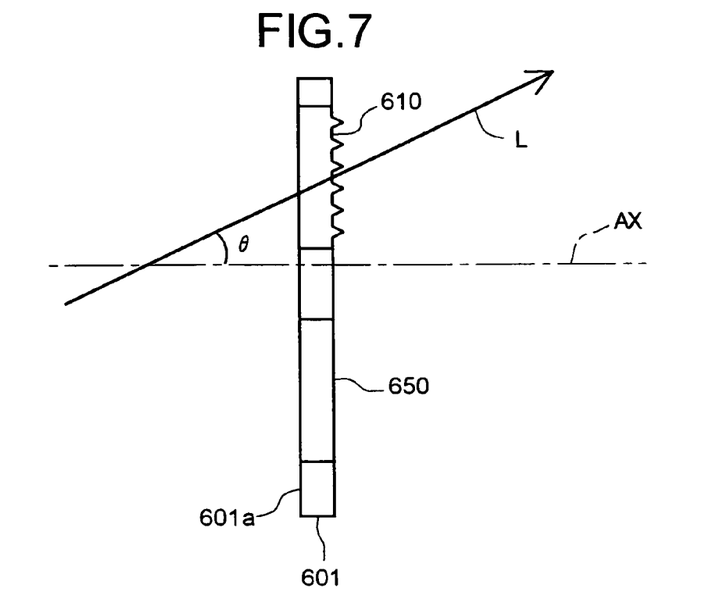
FIG. 7 is a schematic of an optical filter according to the third embodiment.

FIG. 7 is a cross section of the optical filter 601. The prism group 610 is composed of micro prism elements that are arranged periodically. The micro prism element includes a refracting surface, which is a gradient, and a flat surface. The refractive index and the thickness of the parallel plate 650 are configured to be optically equal to those of the prism group 610. The optical filter 601 includes a reflection reducing film on a incident surface 601a where the projection lens 114 outputs the light, so that a light L that the projection lens 114 outputs is not refracted on the incident surface 601a and does not go back to the projection lens 114. The light that goes back is called a stray light and causes the flare and the ghost image. The reflection reducing film lessens the stray light, therefore, the projection image has the higher image quality. The light L that each spatial light-modulator 110R, 110G, and 110B modulates projects the image upward and makes a certain angle θ with an optical axis AX of the projection lens 114.

How the projector according to the present embodiment projects the picture image is explained with reference to FIG. 6A. When the projector projects the picture image, the optical filter 601 is rotated to insert the prism group 610 in the optical path of the light that the projection lens 114 outputs. When the prism group 610 is inserted in the optical path, the notch 602a is engaged with the protrusion, and the pixel of the prism group 610 makes a certain angle with each spatial light-modulator 110R, 110G, and 110B.

The light that each spatial light-modulator 110R, 110G, and 110B modulates enters into the prism group 610 that includes the flat surface and the refracting surface. The light that passes through the flat surface goes as it is while the light that enters into the refracting surface is refracted and deflected. The light deflected projects the image between the pixel images, where the black-matrix image is projected, on the screen 116, so that the pixel images that the light deflected forms is superposed on the black-matrix images. Consequently, the observer does not see the black-matrix image.

How the projector according to the present embodiment projects the text image is explained with reference to FIG. 6B. When the projector projects the test image, the parallel plate 650 is inserted in the optical path of the light that the projection lens 114 outputs while the prism group 610 is removed from the optical path. To insert the parallel plate 650 in the optical path, the optical filter 601 is rotated to the direction of an arrow A till the notch 602b is engaged with the protrusion. The light passes through the parallel plate 650 and projects the sharp text image. Moreover, the optical length of the prism group 610 is substantially equal to that of the parallel plate 650, so that the projector projects the text image in focus even when the parallel plate 650 is inserted in the optical path. The optical filter is arranged close to the opening of the projection lens 114 and protects the lens of the projection lens 114.

Figure 8:
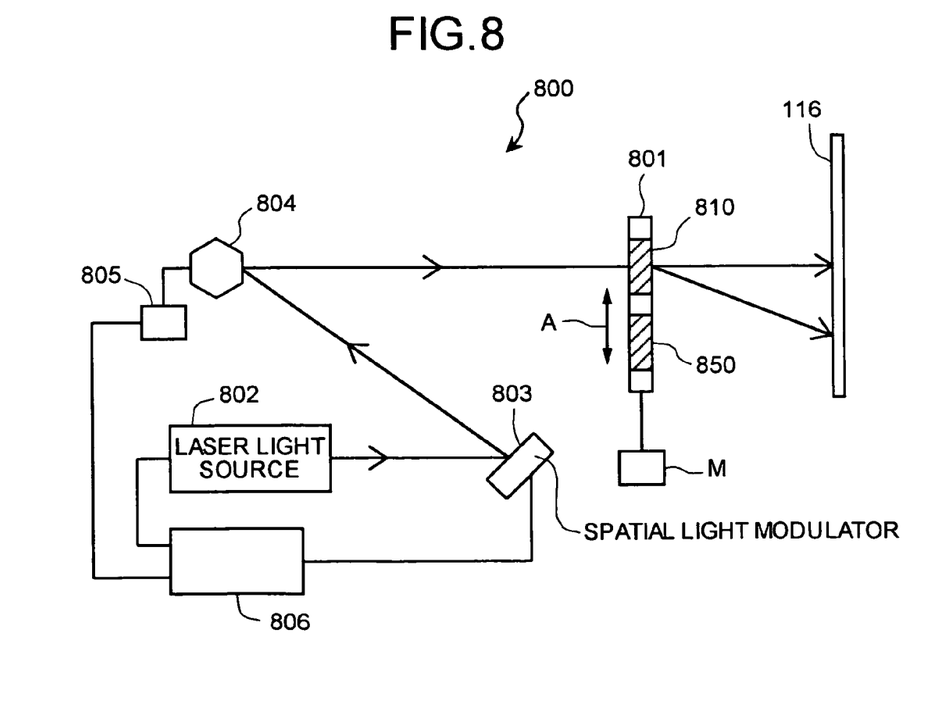
FIG. 8 is a schematic of a projector according to a fourth embodiment of the present invention.

The configuration of a projector 800 according to a fourth embodiment is explained with reference to FIG. 8. The projector 800 is a laser projector unlike the projectors according to the previous embodiments. A laser-light source 802 outputs the light to a spatial light-modulator 803. The laser-light source 802 includes the red-light source, the green-light source, and the blue-light source, and each light source generates each laser light. To give a clear explanation, each light source is not shown in FIG. 8.

The spatial light-modulator 830 includes, for example, a plurality of rectangular diffraction elements that are lined up. The rectangular diffraction elements work independently based on the electronic signal. The amount of the motion of the diffraction element controls the amount of the diffraction light. The laser-light source 802 outputs the light to a component of the beam-shaping optical system (not shown). The component forms the laser light in the form of a line (hereinafter, "linear laser light"), and the long side of the leaner laser light is formed to correspond to the long side of the spatial light modulator 803.

The spatial light-modulator 803 modulates the light based on the image signal and outputs the light to a polygon mirror 804. A polygon mirror drive 805 rotates the polygon mirror 804 around a certain axis, and the polygon mirror 804 scans the leaner laser light toward a direction. A controller 806 controls the strength of the oscillation of the laser light source 802, the spatial light-modulator 803, and the drive of the polygon mirror 804.

The polygon mirror 804 reflects the light and outputs the light reflected to an optical filter 801. If the projector 800 projects the picture image, the motor M inserts a prism group 810 of the optical filter 801 in the optical path. When the linear laser light modulated enters into the prism group 810, the light that passes through the flat surface goes straight while the light that enters into the refracting surface is refracted. Similarly with the previous embodiments, the light refracted forms the image on the black-matrix image. Consequently, the observer sees the high-quality and seamless image without seeing the black-matrix image.

If the projector 800 projects the text image, the motor M inserts a parallel plate 850 of the optical filter 801 in the optical path. Therefore, the polygon mirror 804 reflects the laser light, and then the optical filter 801, namely the parallel plate 850, projects the image on the screen 116 as it is without refracting the laser light. Consequently, the observer sees the sharp image.

Figure 9A:
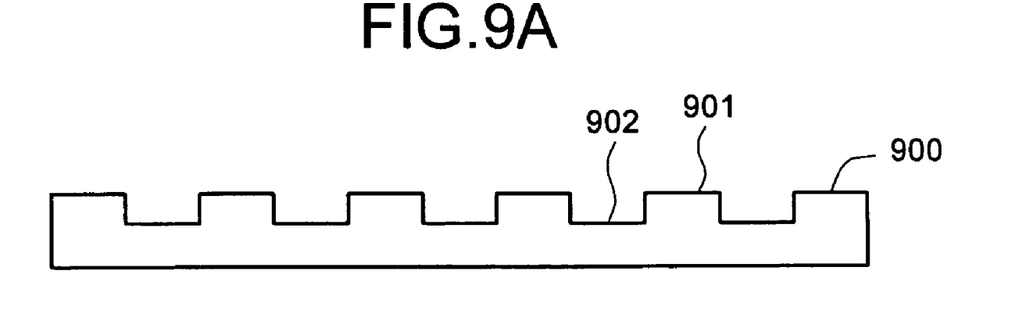
FIG. 9A is a cross section of a diffraction grating.
Figure 9B:
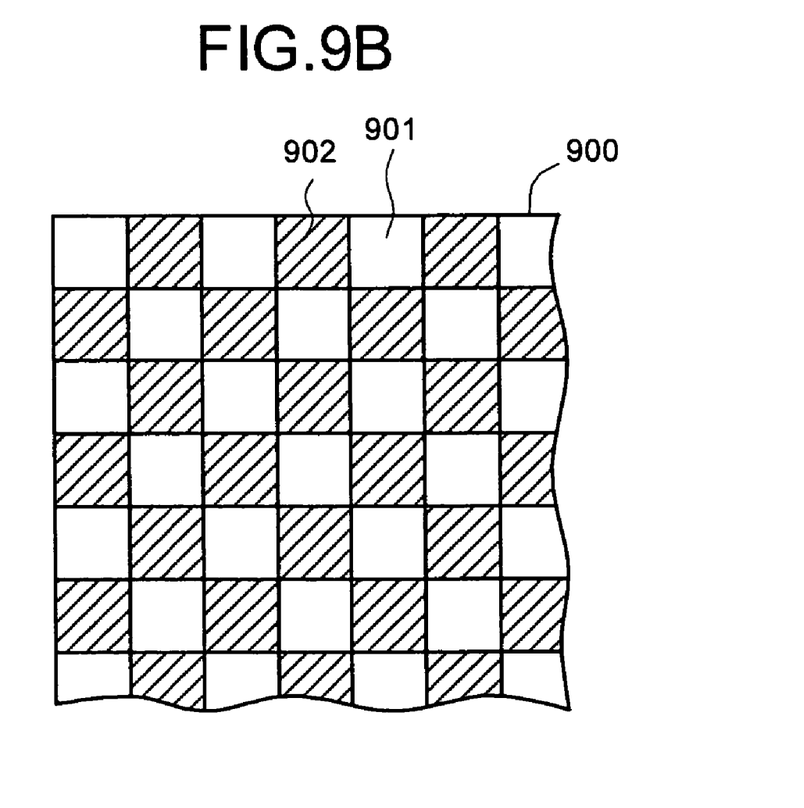
FIG. 9B is a top view of the diffraction grating.

Although the prism group is used as the optical element in the previous embodiments, the present invention is not to be thus limited. As far as the optical element has a function for dispersing the light that passes through the pixel, the optical element may be a diffraction grating, a birefringent plate, a micro lens array, and so on. FIG. 9(a) is a section of a diffraction grating 900. The diffraction grating 900 includes alternating parts of a convex part 901 and a concave part 902 that are formed on a substrate with a certain refractive index by etching. FIG. 9(b) is a top view of the diffraction grating 900. The convex part 901 and the concave part 902 are formed with substantial lattice-pattern periodically. The periodic arrangement of the convex part 901 and the concave part 902 diffracts the incident light to the diffraction grating 900. The diffracted light, such as a plus-or-minus first diffracted light, determines a diffraction angle to superpose the pixel image on the black-matrix image. The pitch and the depth of the periodic arrangement of the diffraction grating 900 is formed to satisfy the diffraction angle.

Although the prism group in the previous embodiments refracts the light that passes through the pixel to superpose the pixel image on the black-matrix image substantially, the present invention is not to be thus limited. The prism group may have appropriate and various refractive indexes, so that the projection image has the intermediate image quality between the image quality of the text image, namely sharp, and that of the picture image, namely seamless without seeing the black-matrix image. Moreover, the optical filter may have a plurality of prism groups that have various optical characteristics, so that the observer sees the images with the various image qualities by setting the corresponding prism group on the optical path. Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A projector comprising:
   a light source that supplies a light;
   a spatial light-modulator that modulates the light based on an image signal and outputs a modulated light;
   a projection lens that projects the modulated light to display an image on a screen; and
   an optical element inserting unit that inserts a first optical element in an optical path, wherein the optical element inserting unit includes a position fixing unit that keeps an angle between the spatial light-modulator and the first optical element constant.

2. The projector according to claim 1, wherein
the optical element inserting unit further includes a second optical element, and selectively inserts the first optical element or the second optical element in the optical path, and
a first optical length when the first optical element is inserted in the optical path is substantially equal to a second optical length when the second optical element is inserted in the optical path.

3. The projector according to claim 2, wherein
the first optical element is either of a refracting optical element and a diffracting optical element, and
the second optical element is a transparent plate.

4. The projector according to claim 1, wherein the optical element inserting unit is arranged in the optical path between the spatial light-modulator and the projection lens.

5. The projector according to claim 1, wherein the optical element inserting unit is arranged between the projection lens and the screen.

* * * * *